(12) United States Patent
Taniguchi et al.

(10) Patent No.: US 8,224,521 B2
(45) Date of Patent: Jul. 17, 2012

(54) COMMUNICATION CONTROL APPARATUS

(75) Inventors: Yoshikazu Taniguchi, Yokkaichi (JP); Masatoshi Nakashima, Nagoya (JP); Setsuro Mori, Kyoto (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 776 days.

(21) Appl. No.: 11/791,029

(22) PCT Filed: Dec. 9, 2005

(86) PCT No.: PCT/JP2005/022667
§ 371 (c)(1),
(2), (4) Date: May 18, 2007

(87) PCT Pub. No.: WO2006/062193
PCT Pub. Date: Jun. 15, 2006

(65) Prior Publication Data
US 2008/0195260 A1    Aug. 14, 2008

(30) Foreign Application Priority Data
Dec. 10, 2004    (JP) .................................. 2004-358415

(51) Int. Cl.
*B60R 16/023*    (2006.01)
(52) U.S. Cl. ...................... 701/34.3; 701/29.1; 701/34.4; 340/3.2; 340/3.21; 702/187
(58) Field of Classification Search .................... 701/33, 701/34; 340/3.2, 825.2, 825.21, 3.21; 702/187
See application file for complete search history.

(56) References Cited

U.S. PATENT DOCUMENTS

| | | | | |
|---|---|---|---|---|
| 4,742,335 A | * | 5/1988 | Vogt | 340/518 |
| 4,982,185 A | * | 1/1991 | Holmberg et al. | 340/4.21 |
| 5,434,861 A | * | 7/1995 | Pritty et al. | 370/449 |
| 6,013,108 A | * | 1/2000 | Karolys et al. | 702/189 |
| 7,072,803 B2 | * | 7/2006 | Viard et al. | 702/190 |

(Continued)

FOREIGN PATENT DOCUMENTS

DE    100 48 808 A1    4/2002

(Continued)

OTHER PUBLICATIONS

German Office Action dated May 2, 2012 in German Application No. 11 2005 003 022.9 (with translation).

*Primary Examiner* — Thomas G. Black
*Assistant Examiner* — Peter D Nolan
(74) *Attorney, Agent, or Firm* — Oliff & Berridge, PLC

(57) ABSTRACT

This invention intends to reduce a time difference in information collection time as much as possible in a vehicle installed network system for collecting information on distributed positions within a vehicle. According to this invention, information on a measurement result by a sensor (23) at a time point after a previously-defined time elapses since a specified signal transmitted regularly is received is held in a sensor data storage register (49) on a network (21) installed within a vehicle, capable of broadcasting, achieved according to a communication method in which a transmission right is supplied regularly, and the information is transmitted at a time point when the transmission right is obtained on the network (21). In the vehicle installed network system for collecting information on the distributed positions within the vehicle, the time difference in the information collection time can be reduced as much as possible.

11 Claims, 7 Drawing Sheets

U.S. PATENT DOCUMENTS

| | | | |
|---|---|---|---|
| 7,168,324 B2 * | 1/2007 | Boda et al. | 73/660 |
| 7,254,504 B2 * | 8/2007 | Klotz et al. | 702/89 |
| 7,269,095 B2 * | 9/2007 | Chamberlain et al. | 367/76 |
| 7,593,429 B2 * | 9/2009 | Jordan et al. | 370/503 |
| 2002/0012401 A1 * | 1/2002 | Karolys et al. | 375/257 |
| 2002/0103592 A1 * | 8/2002 | Gross et al. | 701/103 |
| 2005/0194182 A1 * | 9/2005 | Rodney et al. | 175/24 |

FOREIGN PATENT DOCUMENTS

| | | |
|---|---|---|
| JP | A-61-201538 | 9/1986 |
| JP | A-02-200093 | 8/1990 |
| JP | A-04-000997 | 1/1992 |
| JP | A-2001-037068 | 2/2001 |
| JP | A-2003-168488 | 6/2003 |

* cited by examiner

F I G . 3
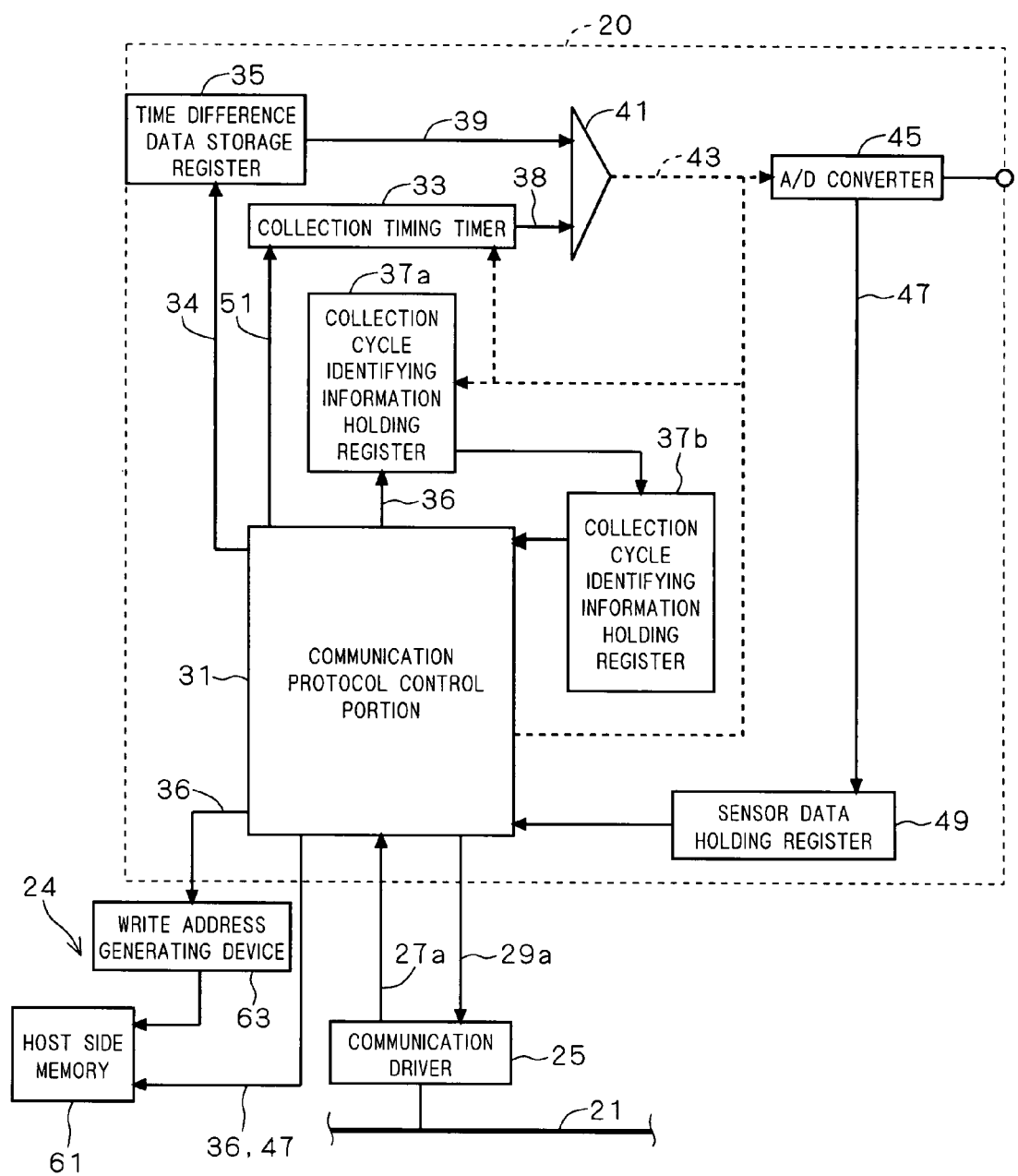

F I G . 6
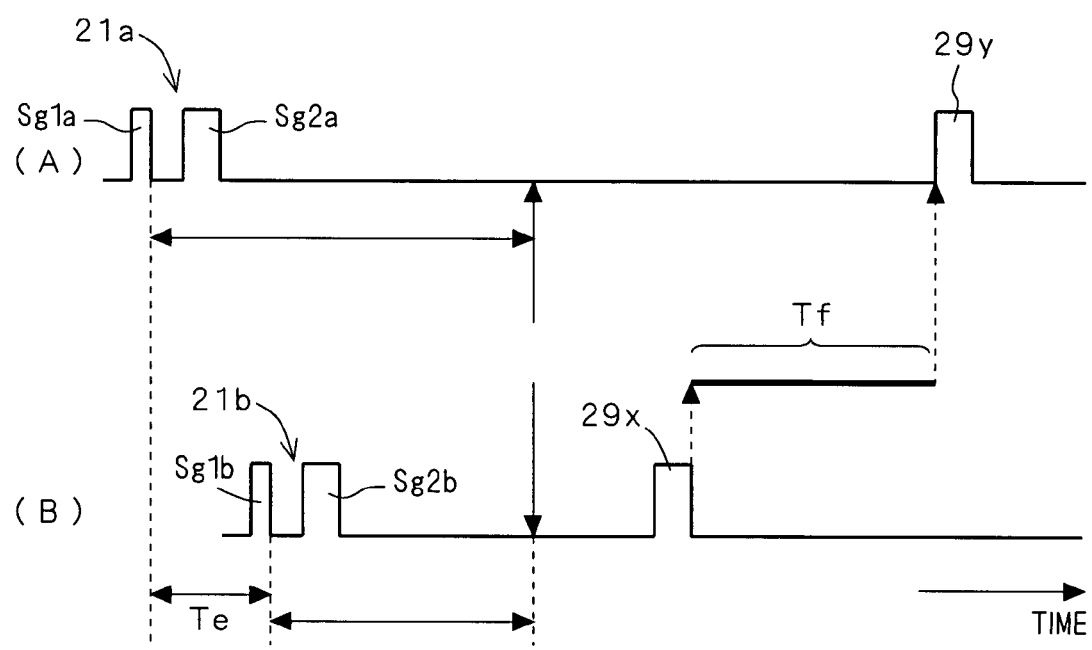

RELATED ART

COMMUNICATION CONTROL APPARATUS

TECHNICAL FIELD

The present invention relates to a communication control apparatus for communicating in a network within a vehicle.

BACKGROUND ART

To collect sensor information as an input for control in a control apparatus within a vehicle, sometimes a plurality of data are required to be collected at the same time and compared with each other.

In a power feeding circuit installed on the vehicle, sometimes, for example, a conductive portion of wire is exposed and keeps contact with a grounding so as to produce a complete short-circuit or chattering that the conductive portion makes contact with the grounding intermittently and cyclically due to vibration or the like during traveling of the vehicle occurs. In these cases, leakage of electricity occurs in the power feeding circuit.

As a method for detecting for leakage of electricity on this power feeding circuit, there is available a method for detecting whether or not leakage of electricity Id is present by detecting currents I1, I2 at two potentials using current sensors 5, 7 when feeding power from a vehicle installed power supply 1 containing a battery to a load 3 and comparing a difference ΔI (I=I1−I2) with a comparison circuit 9. According to such a method, if that difference ΔI is over a specified level, after it is determined that the leakage of electricity Id is caused in a current passage L1 between both the current sensors 5 and 7, an output signal from the comparison circuit 9 is amplified by an amplifier 11 and a circuit breaker 13 is operated corresponding to a signal from this amplifier 11 so as to interrupt supply of electricity from the vehicle installed power supply 1 to the load 3.

In an assembled battery for use in a vehicle, sometimes, a current value of each of individual batteries which constitute this assembled battery and the total current value of the entire assembled battery is obtained so as to control the load of the vehicle based on these current values.

Patent document 1: Japanese Patent Application Laid-Open No. 2001-037068

In the above-described patent document 1, the currents I1, I2 at two locations are detected using a pair of the current sensors 5, 7 and its detection results are compared with the comparison circuit 9. Conventionally, the detection results of the respective current sensors 5, 7 are converted to voltage values and the voltage values are transmitted to the comparison circuit 9 through wires 15, 17.

Consequently, the quantity of the wires 15, 17 increases so that not only the assembly step becomes complicated but also this is inconsistent with a demand for reduction of wires in the vehicle. Particularly, in vehicle field in which advanced control is demanded using sensor information in near future, the weight of the wires affects vehicle performance badly.

If resistance values of the pair of the wires 15, 17 are different, the voltage values outputted from the current sensors 5, 7 drop by the time when they are supplied to the comparison circuit 9 through the wires 15, 17, so that the currents I1, I2 cannot be grasped accurately by the comparison circuit 9.

Such a problem is common to other application example of collecting both the total current values of the assembled battery and the current value of each of individual batteries which constitute the assembled battery.

In views of such a problem, it can be considered to construct a network within the vehicle using specialized hardware having communication function as a solution. Consequently, bad influences due to a difference between the resistance values of plural wires can be eliminated by digitizing the signals, as well as the reduction in weight and the simplification of the manufacturing step by reducing the quantity of the wires.

Here, existing communication system in control network field is largely classified to event driven type and regular transmission type. In order to collect data synchronously in any type, a specified signal is transmitted by broadcasting and when that signal is received, data is collected and then, the data is transmitted to a data requester in other chance.

However, if such operation (broadcasting) is achieved on upper layer of communication layer, time lag due to operation of software installed with upper layer becomes likely to occur, so that data collection is not carried out at the same time. For example, in the event driven type, if completion of collection of response data is intended to be achieved with hardware after the data collection request signal is transmitted, the circuit becomes complicated. Thus, as an existing communication system in the field of the control network, system containing software is achieved.

In addition to the simultaneity, if the frequency of data collection is increased, a high-speed CPU needs to be used, so that the load on the CPU increases, which is a problem to be solved.

In the network in the vehicle, for example, plural networks are connected through gateway and mutual communication is carried out through this gateway. Because the time lag unavoidably occurs when data is exchanged through the gateway in this case, when it is intended to collect sensor information on the plural networks exceeding a single network synchronously, a cycle start signal timing alone is insufficient and additionally, the time lag of the cycle start signal timing between the networks needs to be solved.

DISCLOSURE OF THE INVENTION

Accordingly, a subject of the present invention is to provide a communication control apparatus capable of reducing a time difference in information collection time as much as possible in a vehicle installed network system for collecting information on distributed positions in a vehicle.

To solve the above-described problem, according to the invention described in claim 1, predetermined information at a time point after a previously-defined time elapses since a specified signal transmitted regularly is received is held on a network installed within a vehicle, capable of broadcasting, and achieved according to a communication method in which a transmission right is supplied regularly, and the information is transmitted at a time point when the transmission right is obtained on the network.

The invention described in claim 2 provides a communication control apparatus according to claim 1 wherein the predetermined information is information from a sensor.

The invention described in claim 3 provides the communication control apparatus according to claim 1 or 2 wherein previously-defined time information which is a timing for collecting the predetermined information is capable of being changed by including time specifying information in the specified signal.

The invention described in claim 4 provides the communication control apparatus according to any one of claims 1 to 3, wherein ID information which increases cyclically at every transmission is included in the specified signal, the received ID information and the predetermined information are simultaneously transmitted from an information transmission side, and a host memory address which stores the transmitted predetermined information is changed based on the ID information on an information collection side.

The communication control apparatus of the invention described in claim 1 holds the predetermined information at the time point after the previously-defined time elapses since the specified signal transmitted regularly is received. Therefore, even if a time difference occurs when the information is transmitted at a time point when the transmission right is obtained on the network, highly accurate simultaneity can be secured in information collection from the distributed communication control apparatuses.

The communication control apparatus of the invention described in claim 2 can synchronize information pieces from sensors. Therefore, in a case where leakage of electricity in a current passage within the vehicle is detected with a plurality of current sensors or conditions of respective batteries in an assembled battery are determined by comparison, highly accurate simultaneity can be secured and various determinations by detection and controls can be executed accurately.

The communication control apparatus of the invention described in claim 3 can change the previously-defined time information which is a timing of collecting the predetermined information by including the time specifying information in the specified signal. Therefore, measurement times of a plurality of sensors installed at different locations can be synchronized highly accurately.

According to the communication control apparatus described in claim 4, ID information which increases cyclically at every transmission is included in the specified signal, the received ID information and the predetermined information are simultaneously transmitted from the information transmission side, and a host memory address which stores the transmitted predetermined information is changed based on the ID information on the information collection side, therefore information pieces from a plurality of the communication control apparatuses can be obtained securely.

BRIEF DESCRIPTION OF THE DRAWINGS

FIG. 3 is a diagram showing the communication control system on a host side according to the embodiment of the present invention.

FIG. 6 is a timing chart showing communication state in each network in a case where plural networks are connected through gateway.

BEST MODE FOR CARRYING OUT THE INVENTION

First Embodiment

<Description of Vehicle Installed Network System>

Figure 1:
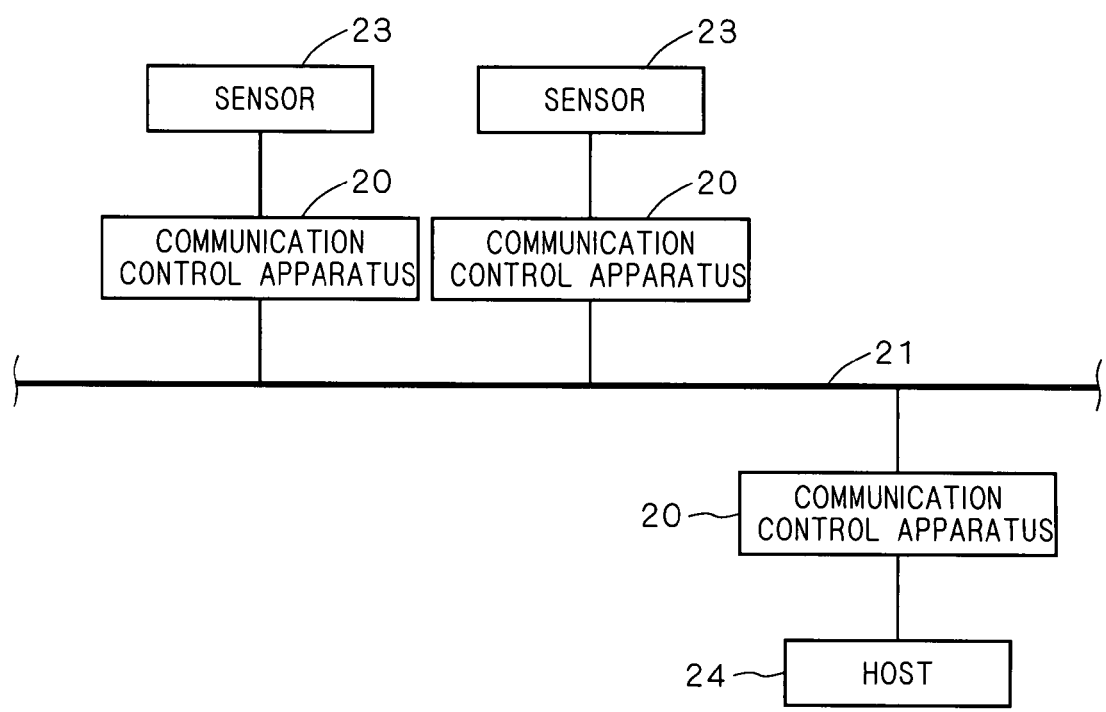
FIG. 1 is a block diagram showing the outline of a vehicle installed network system constructed using a communication control apparatus according to an embodiment of the present invention.

FIG. 1 is a block diagram showing the outline of the vehicle installed network system constructed using a communication control apparatus 20 according to the embodiment of the present invention. In FIG. 1, a communication driver 25 described later is not shown.

In this vehicle installed network system, a plurality of communication control apparatuses 20 are connected to a network 21 and the distributed positions in a vehicle are measured with a plurality of sensors 23. A measurement result thereof is collected by a host 24 which is a computer unit, for example, micro computer. Communication is carried out with the communication control apparatus 20 through the network 21 between each sensor 23 and the host 24. This communication control apparatus 20 is capable of broadcasting and functions as a node on the network achieved according to a communication system which transmission right is given regularly.

<Description of Communication Control Apparatus on Sensor Side>

Figure 2:
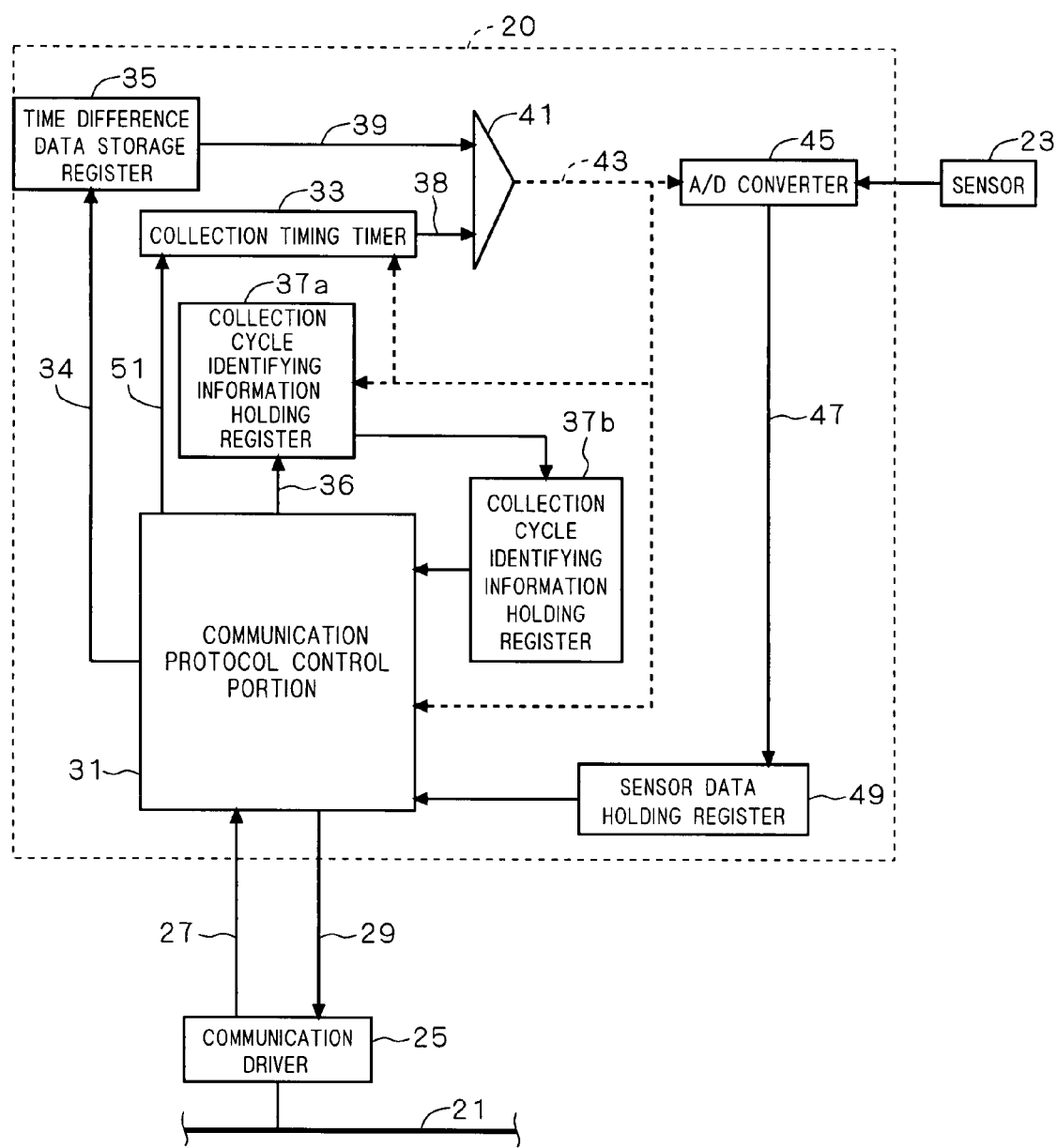
FIG. 2 is a diagram showing the communication control system on a sensor side according to the embodiment of the present invention.

FIG. 2 is a block diagram showing the communication control apparatus 20 connected to each sensor 23. The communication control apparatus 20 connected to each sensor 23 is a semiconductor integrated circuit constructed as a single IC chip for communication based on predetermined synchronous communication method, which secures synchronism of data with only the physical layer and data link layer of communication protocol. Particularly after a predetermined time elapses since a specific signal (special pattern signal not data) transmitted regularly from the communication control apparatus 20 on the host side is received, information from the sensor 23 is analog/digital converted and held and when the transmission right on the network 21 is obtained, the information is transmitted.

More specifically, the communication control apparatus 20 connected to each sensor 23 receives reception data 27 from the network 21 through the communication driver 25 and transmits transmission data 29 to the network 21 through the communication driver 25.

The communication control apparatus 20 includes a communication protocol control portion 31 connected to the communication driver 25; a collection timing timer 33 which measures the collection timing of information from the sensor 23; a time difference storage register 35 which stores reception time difference data 34 as the counter information in the aforementioned specific signal; a collection cycle identifying counter information holding registers 37a, 37b for holding collection cycle identifying counter information 36 which is ID information in the aforementioned specific signal; a comparator 41 which compares a measurement result (hereinafter referred to as timer counter value) 38 by a collection timing timer 33 with reception time difference data (hereinafter referred to as storage time difference data) 39 stored in the time difference data storage register 35; an A/D converter 45 for collecting information form the sensor 23 at a timing in which a collection timing 43 for output is provided based on a comparison result in this comparator 41 and a sensor data storage register 49 for storing information (hereinafter referred to as updated sensor data) 47 of the sensor 23 collected by the A/D converter 45.

The specific signal given by the communication control apparatus 20 on the host side 24 via the network 21 includes cycle start signal (symbol Sg1 in FIG. 4), reception time difference data (count value) 34 coming subsequently and collection cycle identifying counter information (count value) 36.

The communication protocol control portion 31 includes the regular communication function described later, a function which when a cycle start signal (symbol Sg1 in FIG. 4) in the specific signal within a signal given from the network 21 via the communication driver 25, generates a cycle start timing signal 51 and outputs this to the collection timing timer 33, a function which outputs the reception time difference data 34 coming subsequent to the cycle start signal Sg1 within the signal given from the network 21 to the time difference data storage register 35, a function which outputs the collection cycle identifying counter information 36 following the reception time difference data 34 given from the network 21 to the collection cycle identifying information holding resister 37a, a function which transmits updated sensor data 47 held by the sensor data storage register 49 when the communication control apparatus 20 is given the transmission right together with the content of data (collection cycle identifying counter information 36) within the collection cycle identifying information holding register 37b to the network 21 as the transmission data 29, and a function which resets the sensor data storage register 49 based on the collection timing signal 43 from the comparator 41 described later when transmission of the transmission data 29 is completed.

The regular communication function of the communication protocol control portion 31 does not function in the communication control apparatus 20 on the sensor 23 side but functions only in the communication control apparatus 20 on the host 24 side.

The collection timing timer 33 is a timer counter which starts measurement of time at a timing when it receives the start timing signal 51 from the communication protocol control portion 31. This collection timing timer 33 is reset at a timing when the collection timing signal 43 is given from the comparator 41 described later so as to stop the measurement (count).

In the time difference data storage register 35, the reception time difference data 34 given from the communication protocol control portion 31 is held until being reset by the communication protocol control portion 31, or newly given from the communication protocol control portion 31.

The first collection cycle identifying information holding register 37a holds the collection cycle identifying counter information (ID information) 36 given from the communication protocol control portion 31 and the updated sensor data 47 of the A/D converter 45 is held by the sensor data storage register 49. When the collection timing timer 33 is reset and its measurement (count) is stopped, the held collection cycle identifying counter information 36 is transmitted to the second collection cycle identifying information storage register 37b based on the collection timing signal 43 from the comparator 41 described later. After that, the first collection cycle identifying information holding resister 37a is reset.

The second collection cycle identifying information holding register 37b holds the collection cycle identifying counter information 36 at a time point when it is given from the first collection cycle identifying information holding register 37a, and when requested by the communication protocol control portion 31, transmits the held collection cycle identifying counter information 36 to the communication protocol control portion 31.

The comparator 41 compares storage time difference data 39 stored in the time difference data storage register 35 with timer count value 38 of the collection timing counter 33 and when the timer count value 38 meets or exceeds the storage time difference data 39, generates the collection timing signal 43 and then outputs to the A/D converter 45. The collection timing signal 43 from the comparator 41 is inputted to the communication protocol control portion 31, the collection timing timer 33 and the first collection cycle identifying information holding register 37a.

The A/D converter 45 converts analog signal given from the sensor 23 to digital signal when the collection timing signal 43 is given from the comparator 41 and stores this in the sensor storage register 49 as the updated data 47.

The sensor data storage register 49 holds the updated sensor data 47 given from the A/D converter 45 until it is reset by the communication protocol control portion 31 or new updated sensor data 47 is given from the A/D converter 45.

<Description of Communication Control Apparatus on Host Side>

FIG. 3 is a block diagram showing the communication control apparatus 20 connected to the host 24 in the vehicle installed network system shown in FIG. 1. The internal structure of the communication control apparatus 20 shown in FIG. 3 is completely the same as the communication control apparatus 20 on the sensor 23 side shown in FIG. 2 and a semiconductor integrated circuit constructed as an IC chip is applied like the communication control apparatus 20 shown in FIG. 2.

The sensor 23 is not connected to this communication control apparatus 20 and the communication control apparatus 20 is connected to a memory 61 on the host side of the host 24 and a write address generating device 63.

Figure 4:
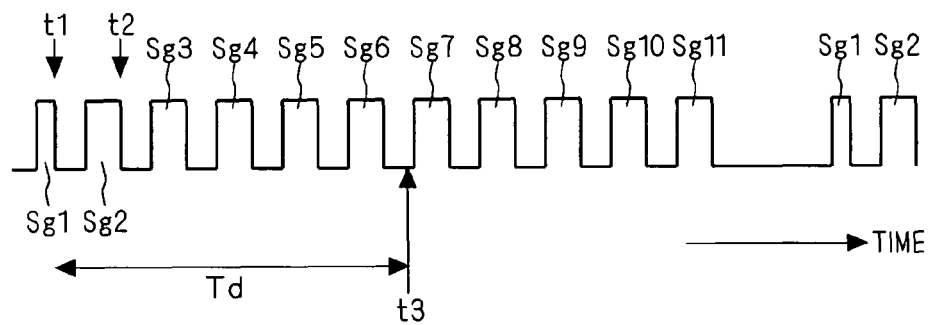
FIG. 4 is a timing chart showing transmission data from the communication control system on host side according to the embodiment of the present invention.

The communication protocol control portion 31 of the communication control apparatus 20 on the host 24 side includes a function (regular communication function) which transmits a signal shown in FIG. 4 to the network 21 as the transmission data 29a by broadcasting regularly, a function which receives data transmitted from the communication control apparatus 20 on the sensor 23 side as the transmission data through the network 21 and the communication driver 25 and disassembles this reception data 27a to the updated sensor data 47 and the collection cycle identifying counter information 36 and a function which writes this updated sensor data 47 and the collection cycle identifying counter information 36 into the host side memory 61 of the host 24.

In the host side memory 61, the updated sensor data 47 and the collection cycle identifying counter information 36 are written into an address determined based on a value set in the write address generating device 63 preliminarily, a value in the collection cycle identifying counter information 36 and a value of the node address of the communication control apparatus 20 which is a transmitter.

The value of the collection cycle identifying counter information 36 is a value which is increased (incremented) cyclically every cycle and transmitted together with time difference information. Therefore, a series of simultaneously collected data of different nodes (communication control apparatus 20) can be distinguished for every cycle.

Regarding the regular communication function, signals shown in FIG. 4 will be described later.

<Measurement Result Collecting Operation>

Of activities of the communication control apparatus having the above-described structure, the operation of collecting information on a measurement result of each sensor 23 in the communication control apparatus 20 on the side of each sensor 23 will be described. FIG. 4 is a diagram showing a signal for regular communication to be transmitted from the communication control apparatus 20 on the host 24 side to the network 21 and its abscissa axis indicates time while a high level condition on the ordinate axis of the signal indicates condition of effective data stream.

The communication protocol control portion 31 of the communication control apparatus 20 (FIG. 3) on the host 24 side transmits the signal shown in FIG. 4 to the network 21 as the transmission data 29a regularly by broadcasting (regular communication function).

In the specific signal shown in FIG. 4, the information Sg2 including the reception time difference data 34 which indicates collection timing time difference and the collection cycle identifying counter information 36 follows the cycle start signal Sg1. Signals Sg3 to Sg11 indicating a timing of allocating to each node (each communication control apparatus 20) follow such information Sg2. A determined timing like the symbols Sg3 to Sg11 is allocated to each communication control apparatus 20 on the side of each sensor 23 on the network 21.

When the signal shown in FIG. 4 flows on the network 21 by broadcasting, the communication control apparatus 20 (FIG. 2) on the side of each sensor 23 receives the cycle start signal Sg1 shown in FIG. 4 through the communication driver 25 and this is inputted to the communication protocol control portion 31.

At a time point indicated by the symbol t1 in FIG. 4, the communication protocol control portion 31 of the communication control apparatus 20 on the side of each sensor 23 shown in FIG. 2 detects that the inputted reception data 27 is the cycle start signal Sg1 and generates cycle start timing signal 51 at the same time. This cycle start timing signal 51 is outputted to the collection timing timer 33. At this time, the collection timing timer 33 starts measurement of time.

Next, the communication control apparatus 20 (FIG. 2) on the side of each sensor 23 receives the information Sg2 (reception time difference data 34 and the collection cycle identifying counter information 36) indicated in FIG. 4 as the reception data 27 and this is inputted to the communication protocol control portion 31.

The communication protocol control portion 31 of the communication control apparatus 20 (FIG. 2) on the side of each sensor 23 outputs the reception time difference data 34 in the information Sg2 at a time point indicated by the symbol t2 in FIG. 4 to the time difference data storage register 35 and the collection cycle identifying counter information 36 in the information Sg2 is outputted to the first collection cycle identifying information holding register 37a.

The reception time difference data 34 in the time difference data storage register 35 set at this timing t2 (FIG. 4) is compared with the timer count value (measurement result) by the collection timing timer 33 by the comparator 41. If time Td (FIG. 4) of the time difference is consumed, the comparator 41 generates the collection timing signal 43 when the timer count value 38 meets or exceeds the reception time difference data 34 (symbol t3 in FIG. 4) and outputs this to the A/D converter 45.

At this time (symbol t3 in FIG. 4), the A/D converter 45 converts the analog signal given from the sensor 23 to digital signal and stores this in the sensor data storage register 49 as the updated sensor data 47. Consequently, the updated sensor data 47 is stored by the sensor data storage register 49.

As a consequence, the collection time of the updated sensor data 47 in the communication control apparatus 20 on the side of each sensor 23 is equal to a time at the time when the time Td of the time difference elapses since the cycle start signal Sg1 of a specific signal is received first by broadcasting and therefore, uniform on every node, that is, in the communication control apparatus 20 on the side of every sensor 23. That is, it is assured that the updated sensor data 47 obtained from the plurality of the sensors 23 is data which have been collected almost at the same time and even if there exists a time error in the collection, it is as small as a clock cycle of each communication control apparatus 20 which is an IC chip. Therefore, it is only an error about $1/16$ to $1/64$ the cycle of data flowing on the network 21.

At this time, the communication protocol control portion 31 resets the collection timing timer 33 and stops the measurement operation. The first collection cycle identifying information holding register 37a transfers the collection cycle identifying counter information 36 stored internally to the second collection cycle identifying information holding register 37b and resets the first collection cycle identifying information holding register 37a.

<Measurement Result Transmission Operation>

Next, the operation of transmitting information on the measurement result collected in the communication control apparatus 20 on the side of each sensor 23 to the communication control apparatus 20 on the side of the host 24 will be described.

Symbols Sg7 to Sg11 in FIG. 4 designate signals transmitted from the communication control apparatus 20 on the side of the host 24 in order to provide the communication control apparatus 20 on the side of each sensor 23 on the network 21 with transmission right.

Figure 5:
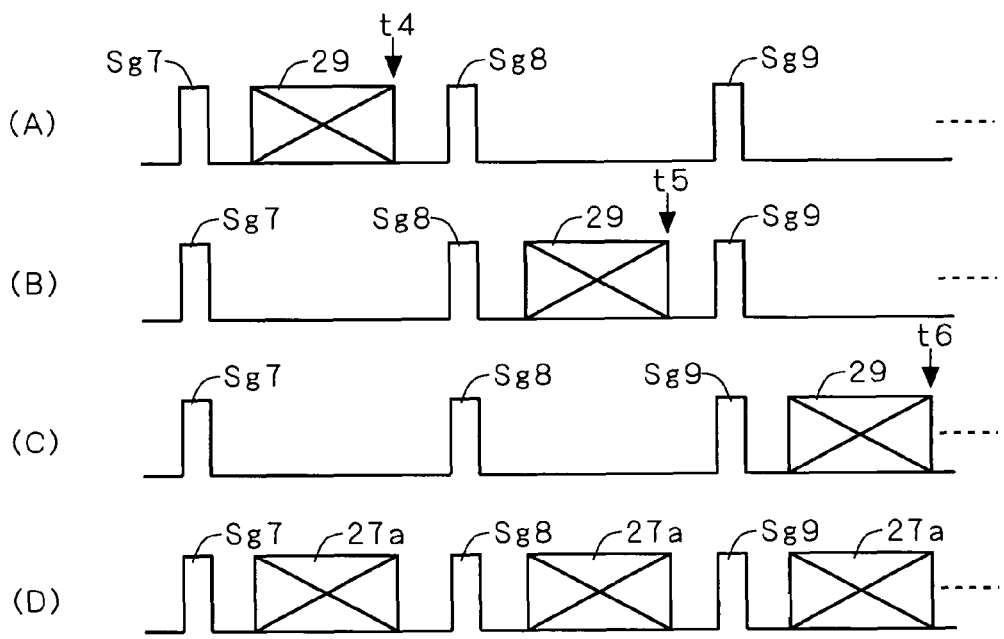
FIG. 5 is a timing chart showing a signal received on the sensor side and a signal transmitted/received by the host side.

FIG. 5 is a diagram for explaining a state of a signal flowing on the network 21 including the signals Sg7 to Sg11 and for example, FIG. 5(A) shows a signal processed in the communication control apparatus 20 on the side of the first sensor 23, FIG. 5(B) shows a signal processed in the communication control apparatus 20 on the side of the second sensor 23, FIG. 5(C) shows a signal processed in the communication control apparatus 20 on the side of the third sensor 23 and FIG. 5(D) shows a state of receiving signals on the network 21 in which the respective signals (A) to (C) are superimposed by the communication control apparatus 20 on the side of the host 24 as the reception data 27a.

In the FIGS. 4, 5, for example, signals Sg7, Sg10 are signals which provide one communication control apparatus 20 with transmission right, signals Sg8, Sg11 are signals which provide other communication control apparatus 20 with the transmission right and signal Sg9 is a signal which provides still other communication control apparatus 20 with the transmission right.

In one communication control apparatus 20 on the side of the sensor 23, when the signal Sg7 is received, the communication protocol control portion 31 shown in FIG. 2 transmits the updated sensor data 47 within the sensor data storage register 49 to the network 21 through the communication driver 25 as the transmission data 29 together with the collection cycle identifying counter information 36 within the second collection cycle identifying information storage register 37b.

In the communication control apparatus 20 on the side of the sensor 23, at the transmission completion time t4 (FIG.

5(A)) of the transmission data 29 responding to the signal Sg7, resets the updated sensor data 47 held within the sensor data storage register 49.

Likewise, the other communication control apparatus 20 on the side of the sensor 23 resets the updated sensor data 47 held within the sensor data storage register 49 at the transmission completion time t5 of the transmission data 29 responding to the signal Sg8 in FIG. 5(B).

The transmission data 29 from the communication control apparatus 20 on the side of each sensor 23 obtained in this way is received successively and regularly by the communication control apparatus 20 (FIG. 3) on the side of the host 24 with a time lag as the reception data 27a as shown in FIG. 5(D).

At this time, the communication protocol control portion 31 of the communication control apparatus 20 on the side of the host 24 disassembles the reception data 27a to the updated sensor data 47 and the collection cycle identifying counter information 36. Then, this updated sensor data 47 and the collection cycle identifying counter information 36 are written into the memory 61 on the host side of the host 24. At this time, in the memory 61 on the host side, the updated sensor data 47 and the collection cycle identifying counter information 36 are written into an address determined based on the value set by the address generating unit 63 preliminarily, the value of the collection cycle identifying counter information 36 and the node address value of the communication control apparatus 20 which is a transmitter.

As described in the <measurement result collection operation>, it is assured that the updated sensor data 47 obtained from the plurality of the sensors 23 is data which have been collected almost at the same time and even if there exists a time error in the collection, it is as small as a clock cycle of each communication control apparatus 20 which is an IC chip. Therefore, it is only an error about $1/16$ to $1/64$ the cycle of data flowing on the network 21.

Thus, even if the transmission data from the communication control apparatus 20 on the side of each sensor 23 is received successively and regularly by the communication control apparatus (FIG. 3) on the side of the host 24 as the reception data 27a with a time lag as shown in FIG. 5(D), the simultaneity of the respective reception data 27a is already secured. That is, in the vehicle installed network system for collecting information by measuring with each sensor 23 at distributed positions in the vehicle, the time lag in the measurement time can be almost excluded.

In this case, the collection cycle identifying counter information 36 is increased (incremented) cyclically every cycle of the regular signals Sg7 to Sg11 and transmitted together with the reception time difference data 34. Thus, a series of the simultaneously collected data of different nodes (communication control apparatus 20 on the side of the sensor 23) can be distinguished for every cycle.

<In a Case of Distributing Communication Control Apparatuses Over a Plurality of Networks>

An example represented in FIGS. 1 to 3 shows a condition in which a plurality of the communication control apparatuses 20 are connected to a single network 21. In some case, the communication control apparatuses 20 are distributed over different networks while the two networks 21 are connected through a gateway (not shown).

If the communication control apparatus 20 on the side of the host 24 which uses information and the communication control apparatus 20 on the side of the sensor 23 which collects information are connected to different networks 21, a node (gateway node) which connects the plural networks 21 has a difference timer which starts by receiving the cycle start signal Sg1 of an upper network, which has a function for measuring a difference relative to the cycle start signal Sg1 of the lower network, so as to solve the time difference.

FIG. 6 is a timing chart of a case of collecting simultaneous data beyond the network 21. FIG. 6(A) indicates the operation timing of an upper network 21a which the data collecting side node (communication control apparatus 20 on the side of the sensor 23) and FIG. 6(B) indicates the operation timing of a lower network 21b. Symbol Sg1a in FIG. 6 designates a cycle start signal flowing on the upper network 21a, symbol Sg1b designates a cycle start signal flowing on the lower network 21b, symbol Sg2a designates reception time difference data flowing on the upper network 21a and symbol Sg2b designates reception time difference data flowing on the lower network 21b. There occurs a delay time Te due to processing action of a gateway (not shown) between the upper network 21a (FIG. 6(A)) and the lower network 21b (FIG. 6(B)).

If the delay time Te is occurred due to the gateway as shown in FIG. 6, the value of the reception time difference data Sg2a of the upper network 221a minus the delay time Te is transmitted to the lower network 21b as the reception time difference data Sg2b of the lower network 21b.

Transmission data 29x from an information collection node (communication control apparatus 20 on the side of the sensor 23) of the lower network 21b is held by the gateway node only in a predetermined period Tf and an information collection node (communication control apparatus 20 on the side of the sensor 23) of the upper network 21a transmits information 29y to the upper network 21a when it obtains transmission right at the upper network 21a.

At this time, the communication control apparatus 20 on the side of the host 24 disassembles to the updated sensor data 47 and collection cycle identifying counter information 36, received as the reception data 27a and writes these into the memory 61 on the host side.

In this case, the collection cycle identifying counter information 36 is a value which is increased (incremented) cyclically every cycle of the regular signals Sg7 to Sg11 and transmitted together with the reception time difference data 34. Therefore, a series of the simultaneously collected data of different nodes (communication control apparatus 20 on the side of the sensor 23) can be distinguished every cycle.

As evident from above, in this embodiment, data synchronism is secured with only the physical layer and data link layer of the communication protocol by hardware which is an IC chip without use of any software program, so that collection of information from the distributed communication control apparatuses 20 can be executed synchronously at a high precision.

Because the event driven type which executes the control with the application layer (software) of communication protocol moves to a next operation after analyzing data, its operation becomes complicated so that data dispersion based on time is intensified thereby disabling to secure the simultaneity of signal transmission. Contrary to this, according to this embodiment, the communication control is executed with only the hardware which is the IC chip and synchronism is secured with the physical layer and data link layer, so that the simultaneity of the information collection can be secured easily.

Further, because the hardware is started by simple trigger of receiving a specific signal according to the regular communication system, the simultaneity of the operation can be secured. More specifically, information from each sensor 23 can be collected at a synchronous precision of less than ±1 bit on communication. Thus, an application range of measurement is widened.

For example, assuming that the time of communication signal 1 bit on the network 21 is 0.5 micro seconds, it can be considered that this can be applied to a measurement object whose variation minimum time is 1 micro seconds or more.

This system may be constructed to accept information on a measurement result of the sensor 23 when the cycle start signal Sg1 is received without using the reception time difference data 34 of the time difference data storage register 35. In this case, if a plurality of the networks 21 are connected beyond the gateway (not shown), the collection timings of the measurement results of the sensors 23 connected to each network 23 cannot be synchronized.

According to this embodiment, using the reception time difference data 34 has an advantage that the measurement times of the plural sensors 23 installed at different positions can be synchronized at a high precision.

Example 1

Figure 7:
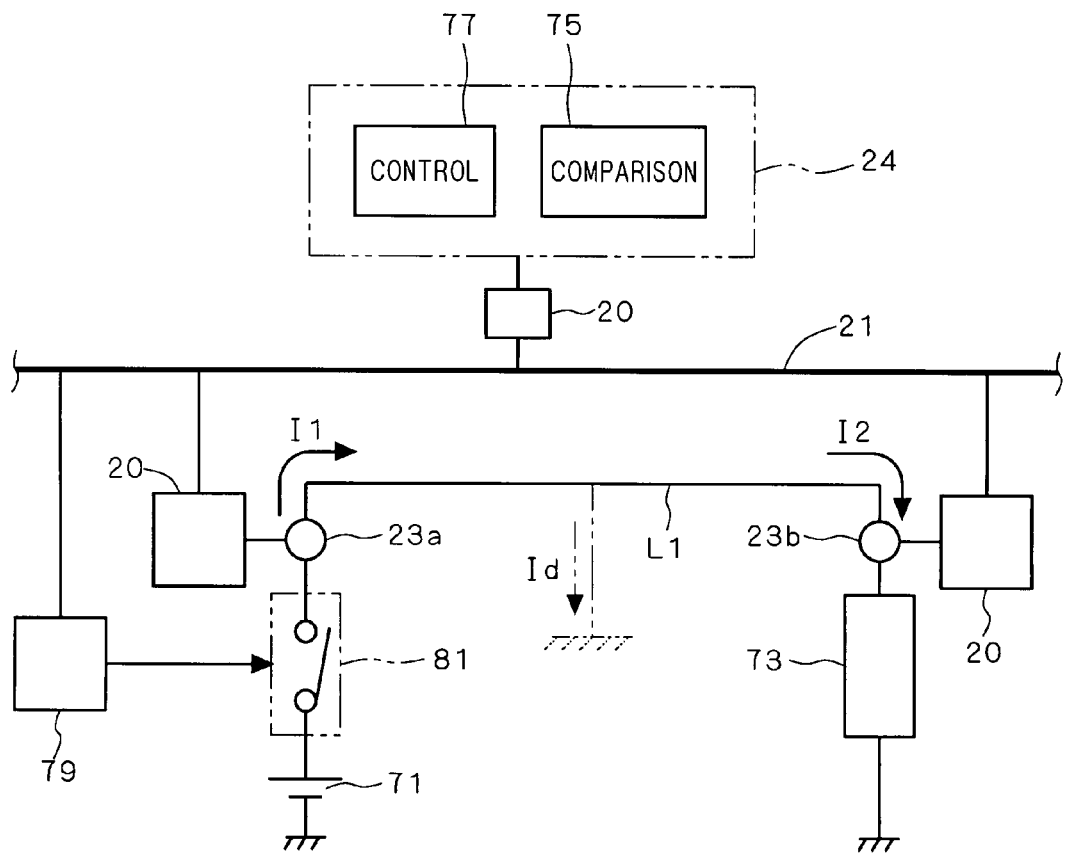
FIG. 7 is a block diagram showing a leakage preventing circuit of a first example which the communication control apparatus of the embodiment of the present invention is applied.

A specific example (example 1) of the communication control apparatus 20 of this embodiment will be described. FIG. 7 is a block diagram showing a leakage preventing circuit in a vehicle using the communication control apparatus 20 of the example 1. In FIG. 7, the communication driver 25 is not shown.

This leakage preventing circuit detects currents I1, I2 at two locations with current sensors 23a, 23b when supplying power from a battery 71 such as battery to a load 73 and compares a difference ΔI (=I1−I2) between these currents I1 and I2 with a comparison circuit 75 so as to detect whether or not leakage of electricity Id is present in the current passage L1 between the poser supply 71 and the load 73. Particularly by transmitting the information on the currents I1, I2 detected by the respective current sensors 23a, 23b to the comparison circuit 75 within the host 24 with digital signals, a difference in resistance values in both the current passages between the respective current sensors 23a, 23b and the comparison circuit 75 in the host 24 makes no influence even if there is generated such a difference in the resistance value.

In this case, the respective current sensors 23a, 23b correspond to the sensor 23 in FIGS. 1, 2. The host 24 is provided with the control circuit 77 and if it determines that leakage of electricity occurs based on a comparison result of the comparison circuit 75, the control circuit 77 transmits a control signal to the network 21 through the communication control apparatus 20 and a predetermined drive control circuit 79 receives this control signal and opens a circuit breaker 81. Consequently, supply of power to the current passage L1 between the power supply 71 and the load 73 is interrupted so as to prevent leakage of electricity.

If leakage of electricity continues in a predetermined current passage L1 of a vehicle, usually a predetermined protective circuit functions, for example, so that a fuse is broken. However, if the leakage of electricity occurs intermittently due to vibration or the like, sometimes breaking of the fuse is not carried out. Consequently, arc discharge can be generated.

In this case also, this embodiment enables to obtain a measurement result with the respective current sensors 23a, 23b while maintaining the simultaneity in an extremely short cycle and detect leakage of electricity with the simultaneity based on this. Consequently, it can detect even a leakage of electricity in a moment securely and rapidly. Because not only continued leakage of electricity but also intermittent leakage of electricity can be detected securely, the arc discharge can be prevented securely by shutting down the current passage L1 in which leakage of electricity is occurred as described in the example 1 from the power supply 71. While in a case of the intermittent leakage of electricity which actually causes the arc discharge, its interruption cycle is several msec to several tens msec, the cycle of detecting leakage of electricity from information on the respective current sensors 23a, 23b of this embodiment is several μsec to several tens μsec. Then, the measurement results using a pair of the current sensors 23a, 23b are synchronized highly accurately. Therefore, by detecting intermittent leakage of electricity securely so as to break the supply of electricity, the arc discharge can be prevented securely.

In this example 1, needless to say, not only the leakage of electricity but also continued or intermittent breaking of wire in the current passage L1 near the load 73 can be detected. In this case, although the current I1 near the power supply 71 is over a predetermined value, if the current I2 near the load 73 is zero, it can be determined that the breaking of wire is occurred in the current passage L1 easily.

Example 2

Figure 8:
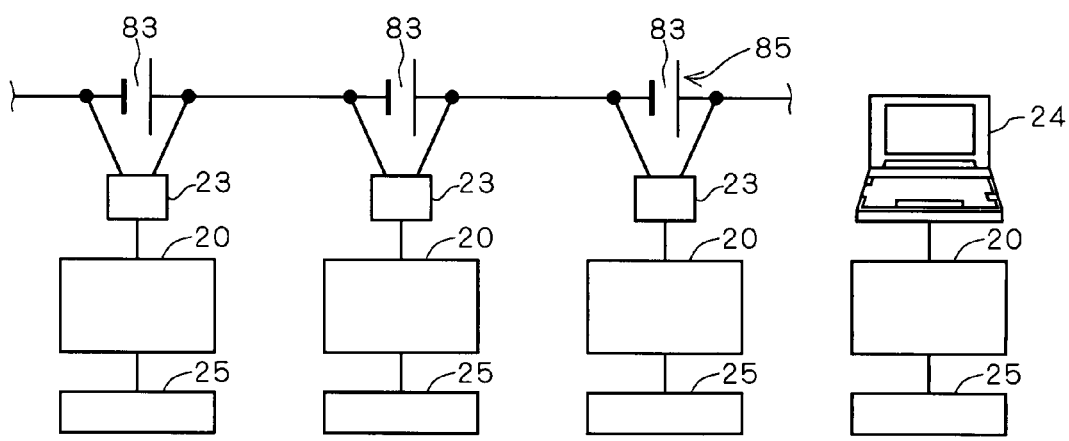
FIG. 8 is a block diagram showing a battery condition detecting circuit of a second example which the communication control apparatus of the embodiment of the present invention is applied.
Figure 9:
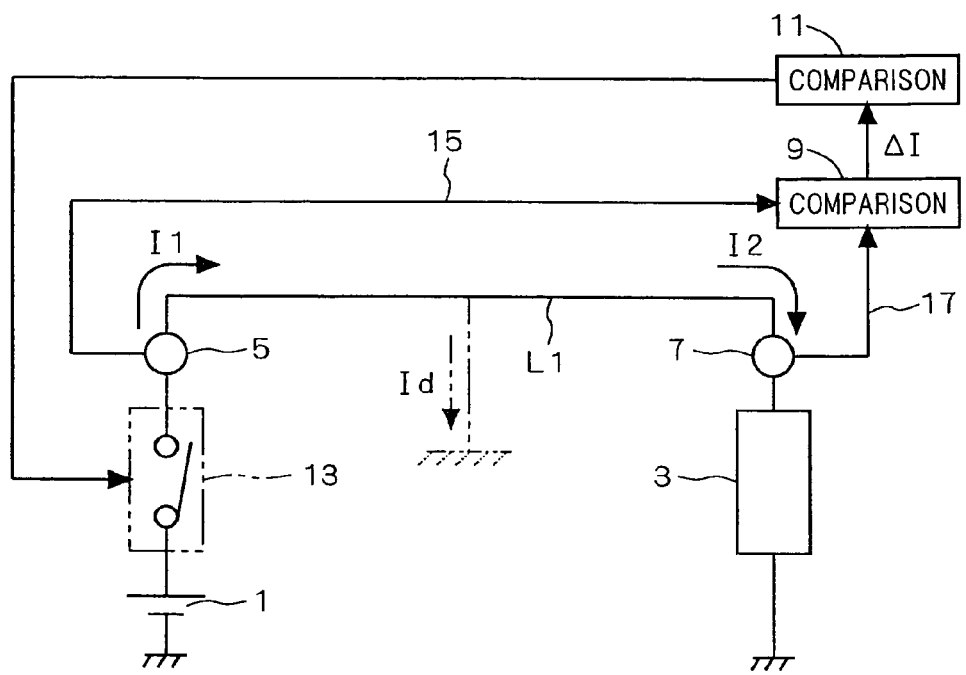
FIG. 9 is a block diagram showing a conventional leakage preventing circuit.

Other specific example (example 2) of the communication control apparatus 20 of this embodiment will be described. FIG. 8 is a block diagram showing the battery condition detecting circuit of assembled battery 85 constructed by connecting three batteries (batteries) in a vehicle employing the communication control apparatus 20 of this example 1.

In this battery condition detecting circuit, the voltages of the batteries 83 are measured with a highly accurate simultaneity with the three sensors (voltage sensors) with the cycle start signal Sg1 (FIG. 4) from the communication control apparatus 20 which serves as a master node on the side of the host 24 as a trigger. That is, each node (communication control apparatus 20 on the side of the sensor 23) which receives the cycle start signal Sg1 increases (increments) the time counter in the collection timing timer 33 while comparing with the reception time difference data 34 (FIG. 2) received continuously and when this count value exceeds the value of the reception time difference data 34, holds a measurement result of the sensor 23 collected by the A/D converter 45 in the sensor data storage register 49. Then, when data transmission timing (symbols Sg7 to Sg11 in FIG. 4) is reached, the measurement result is transmitted to the network 21. The timing of collecting the measurement result by the A/D converter 45 is equal on every node (communication control apparatus 20 on the side of the sensor 23) which is within a time difference of 1 bit on communication. For example, if it is assumed that the communication speed is 1 Mbps, the time difference is ±msec which indicates that a sufficient simultaneity is secured to a current value deflection within the vehicle.

Therefore, the condition of each battery 83 can be detected at a high accuracy.

In the meantime, although in the above embodiment, the signals Sg7 to Sg11 transmitted from the communication control apparatus 20 on the side of the host 24 are used in order to obtain the transmission right at each node (communication control apparatus 20 on the side of the sensor 23), the transmission data 29 may be transmitted after measuring a fixed time respectively after each node (communication control apparatus 20 on the side of the sensor 23) receives the cycle start signal Sg1.

Although the communication control apparatus 20 which is an IC chip for communication based on synchronous communication method has been exemplified in the above embodiment, additionally, FlexRay method IC chip may be employed.

What is claimed is:

1. A communication control system comprising:
a first communication control apparatus on a host side, and
a plurality of communication control apparatuses connected to said first communication control apparatus, wherein:
the first communication control apparatus transmits a specified signal to the plurality of communication control apparatuses by broadcasting regularly,
each of the plurality of communication control apparatuses starts measurement of time at a timing when the specified signal transmitted to the plurality of communication control apparatuses is received on a network installed within a vehicle, and collects and holds respective predetermined information after the measured time meets or exceeds a previously-defined time,
the broadcasting is achieved according to a communication method in which a transmission right is supplied regularly, and
the respective predetermined information is transmitted to the first communication control apparatus at a time point when the transmission right provided regularly on said network is obtained.

2. The communication control system according to claim 1, wherein said predetermined information is information from a sensor.

3. The communication control system according to claim 1, wherein
previously-defined time information which is a timing for collecting said predetermined information is changed by including time specifying information in the specified signal.

4. The communication control system according to claim 1, wherein
ID information which increases cyclically at every transmission is included in the specified signal, said received ID information and said predetermined information are simultaneously transmitted from an information transmission side, and a host memory address which stores said transmitted predetermined information is changed based on said ID information on an information collection side.

5. The communication control system according to claim 2, wherein
previously-defined time information which is a timing for collecting said predetermined information is changed by including time specifying information in the specified signal.

6. The communication control system according to claim 2, wherein
ID information which increases cyclically at every transmission is included in the specified signal, said received ID information and said predetermined information are simultaneously transmitted from an information transmission side, and a host memory address which stores said transmitted predetermined information is changed based on said ID information on an information collection side.

7. The communication control system according to claim 3, wherein
ID information which increases cyclically at every transmission is included in the specified signal, said received ID information and said predetermined information are simultaneously transmitted from an information transmission side, and a host memory address which stores said transmitted predetermined information is changed based on said ID information on an information collection side.

8. The communication control system according to claim 5, wherein
ID information which increases cyclically at every transmission is included in the specified signal, said received ID information and said predetermined information are simultaneously transmitted from an information transmission side, and a host memory address which stores said transmitted predetermined information is changed based on said ID information on an information collection side.

9. The communication control system according to claim 1, wherein
each of the plurality of communication control apparatuses includes a register for holding the previously-defined time.

10. The communication control system according to claim 9, wherein
each of the plurality of communication control apparatuses includes a comparator which compares the measured time since a timing when the specified signal is received and the previously-defined time, and outputs a collection timing signal after the measured time meets or exceeds the previously-defined time.

11. The communication control system according to claim 9, wherein
the first communication control apparatus transmits a signal including the previously-defined time, and
each of the plurality of communication control apparatuses holds the specified signal transmitted from the first communication control apparatus in the register.

* * * * *